Feb. 6, 1940.     R. STEVENSON     2,189,685
FLUID SEAL
Filed April 6, 1937     4 Sheets-Sheet 1
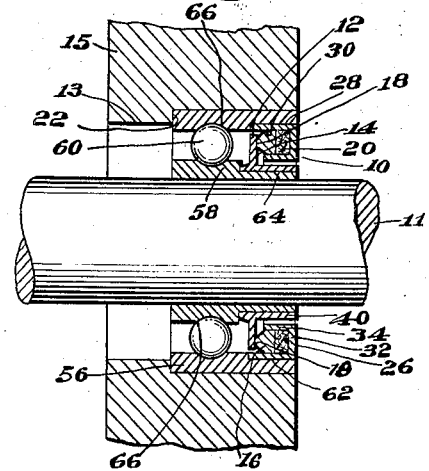
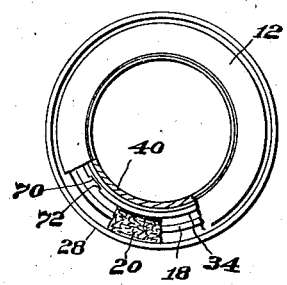
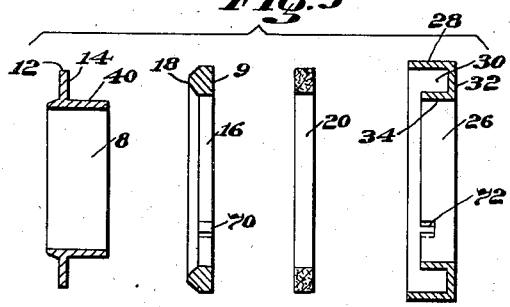
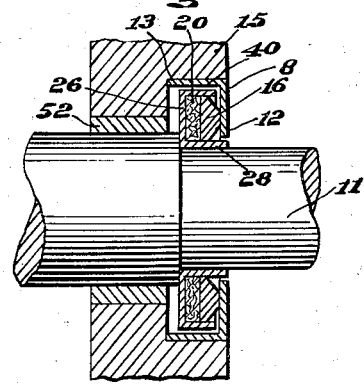
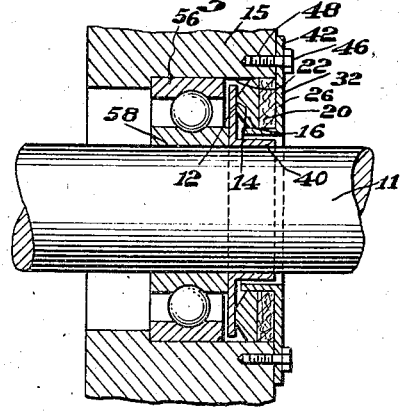
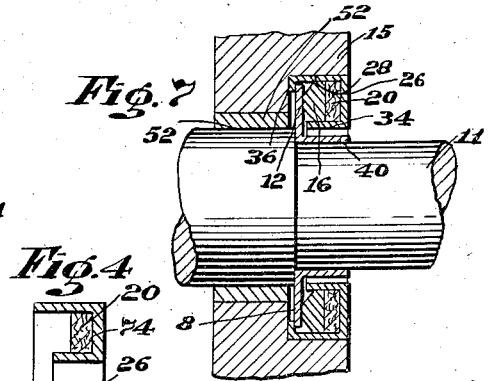
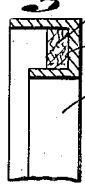
Inventor
Robert Stevenson
By Thomas A. Jenkins
Attorney

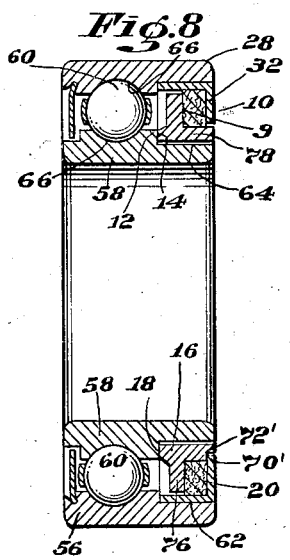
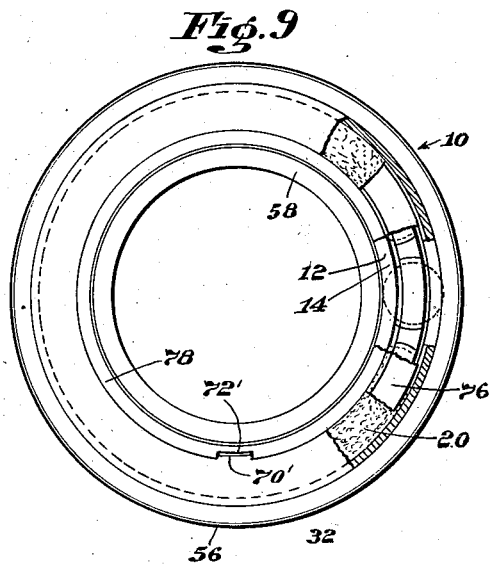
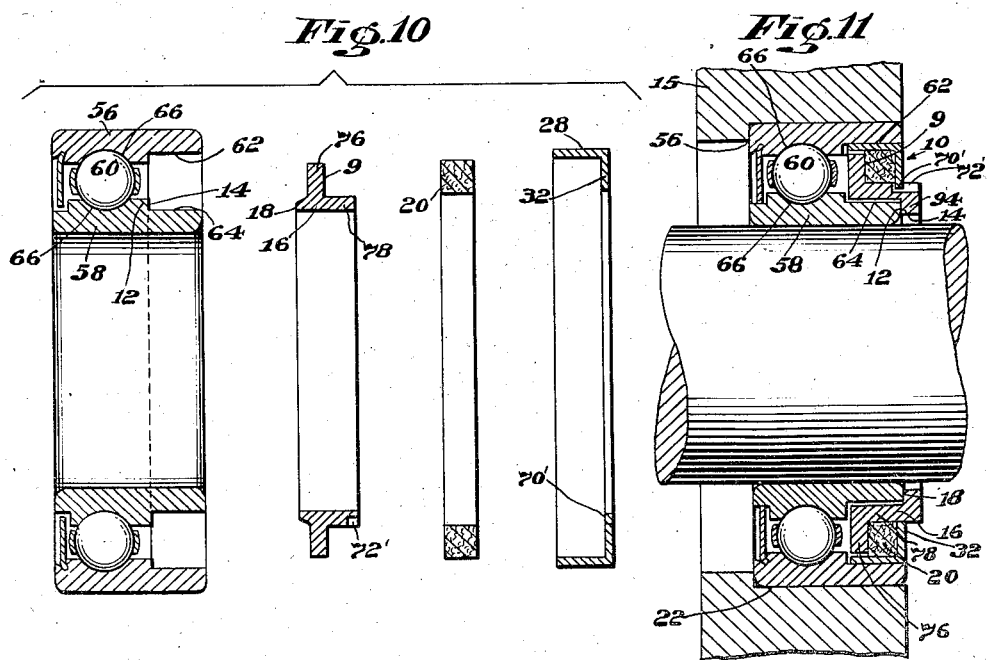

Feb. 6, 1940.   R. STEVENSON   2,189,685
FLUID SEAL
Filed April 6, 1937   4 Sheets-Sheet 3

Feb. 6, 1940.     R. STEVENSON     2,189,685
FLUID SEAL
Filed April 6, 1937     4 Sheets-Sheet 4
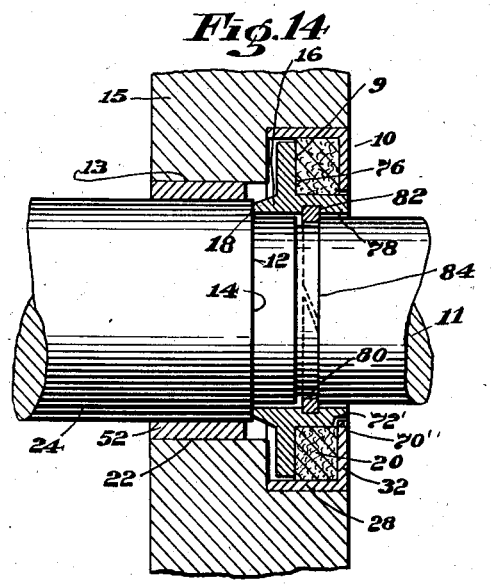
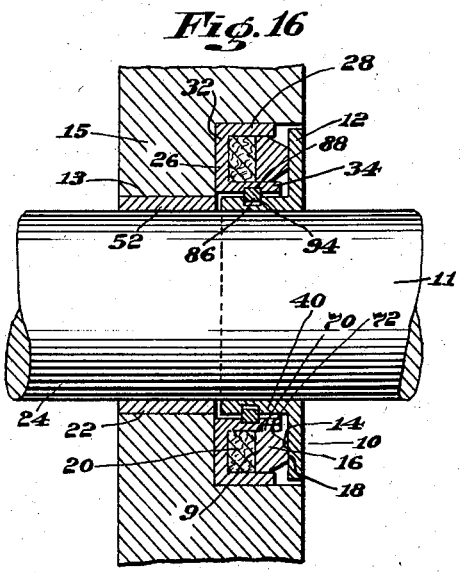
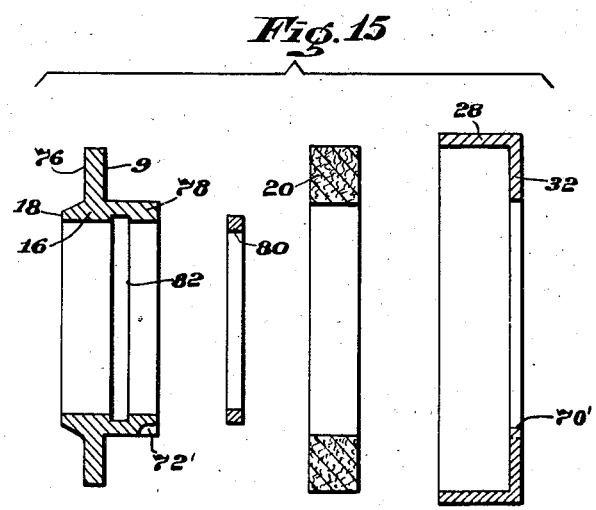
Inventor
Robert Stevenson
By Thomas A. Jenkes
Attorney Patented Feb. 6, 1940

2,189,685

UNITED STATES PATENT OFFICE 2,189,685

FLUID SEAL

Robert Stevenson, West Barrington, R. I., assignor to Sealol Company, a corporation of Rhode Island Application April 6, 1937, Serial No. 135,300

5 Claims. (Cl. 286—7)

My invention relates to improvements in oil or fluid seals, and particularly to that type of seal adapted for use with parts designed for relative rotation, as with a shaft and housing construction.

An object of my invention is to provide a seal for this purpose with a minimum number of simple parts, which is at all times positive in its action.

A further object of my invention is to provide a seal which may be sold either as a self-contained unit ready for easy attachment in a desired position, or as a group of parts ready to assemble in a desired position, providing a seal in either case which may be readily disassembled for replacement of parts.

A further object of my invention is to provide a unitary combination oil seal and anti-friction bearing, which may be sold as a self-contained unit, and be readily attached to a shaft and housing construction, as by insertion between radially-spaced concentric surfaces thereof; or which may be sold as a group of parts ready for attachment thereto. It is further an object of my invention to provide such a unitary combination oil seal and anti-friction bearing, which substantially eliminates lateral or axial sway in the bearing, or to provide an oil seal which, when assembled for use with an anti-friction bearing, performs the same function.

Heretofore, oil seals have been provided, in which there has been a radial flange having a bearing surface and some means for forcing a sealing ring or washer axially against the bearing surface, the means usually comprising a spring or springs. Such springs, however, have not proved entirely satisfactory for this purpose, for the reason that they will not force the sealing surface evenly against the bearing surface throughout its circumference. In addition, springs are expensive, easily wear out or get out of order, and are relatively hard to replace.

My invention, in one aspect, includes an axially expansible seal in which the axially expansible means is a solid, fluid impervious ring which is either compressed in the unit as sold, or may be compressed in the act of assembly with parts designed for relative rotation. As compressed, the resilient properties of the ring maintain a positive seal over a long period of time, providing a seal with small friction and long wearing properties.

In other aspects, my invention includes an axially expansible seal of simple construction, either alone or in combination with an anti-friction bearing.

These and such other objects of my invention as may hereinafter appear will be best understood from a description of the accompanying drawings, in which Fig. 1 is a longitudinal sectional view taken through a housing and shaft construction showing an embodiment of my invention in section, comprising a unitary anti-friction bearing and oil seal unit, the shaft being shown in elevation;

Fig. 2 is a face view of the oil seal unit shown in Fig. 1 with parts broken away;

Fig. 3 is a disassembled sectional view of the various parts of the oil seal of Figs. 1 and 2;

Fig. 4 is an enlarged detailed sectional view showing two of the parts of Fig. 3 in mounted relation;

Fig. 5 is a sectional view similar to Fig. 1, showing a modified form of my invention;

Fig. 6 is a sectional view showing a further modified form of my invention, generally similar to Fig. 1, but with the parts reversed, and with a separate friction bearing for the shaft;

Fig. 7 is a sectional view showing a further modified form of an oil seal unit;

Fig. 8 is a longitudinal sectional view showing a modified form of the unitary anti-friction bearing and oil seal unit shown in Fig. 1;

Fig. 9 is a face view of the oil seal unit shown in Fig. 8;

Fig. 10 is a disassembled sectional view of the parts of the oil seal unit shown in Figs. 8 and 9;

Fig. 11 is a sectional view of a modified form of the oil seal shown in Fig. 8;

Fig. 14 is a longitudinal sectional view of a modified form of the device shown in Fig. 12, with an ordinary friction bearing for the shaft;

Fig. 15 is a disassembled sectional view of the parts of the oil seal as shown in Fig. 14; and Fig. 16 is a further modified form of my device.

Figure 12:
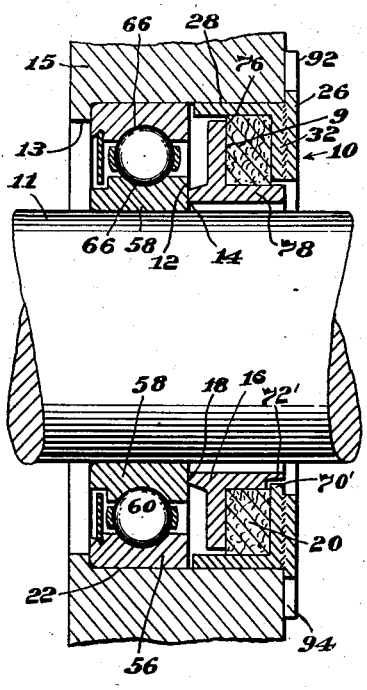
Fig. 12 is a sectional view of a modified form of oil seal shown in Fig. 5.

Referring to the drawings, wherein like reference characters indicate like parts throughout, 10 generally indicates an oil seal constructed in accordance with my invention for use between a shaft 11 and a housing 15. My invention may be used either with a shaft revolving within the housing, or with a housing revolving about the shaft, as for instance, the hub of an automobile wheel upon its axle shaft.

As shown in Fig. 1, my oil seal 10 may be mounted between concentric radially-spaced surfaces of anti-friction bearing members, such as outer and inner raceway rings 56 and 58. For this purpose, outer ends of these raceways may be provided with a counterbore 62 and an annular reduced portion 64 respectively. The other ends of raceways 56 and 58 are provided with roller bearings such as balls 60 interposed between the raceways in channels 66, according to the usual construction.

In my preferred form, my oil seal comprises four elements. Rigidly seated in the reduced portion 64 of the inner raceway 58 is the annular part 8, as shown in Fig. 3, having a collar portion 40 adapted to engage with a press fit the reduced surface 64, and having an annular flange 12 projecting radially therefrom, having on one side thereof a bearing surface 14 which may be ground, polished, or otherwise finished. To provide a more accurate fit, the collar portion may be extended slightly beyond flange 12, as shown.

Rigidly mounted on the outer raceway 56 for rotation therewith relative to the inner raceway 58 and flanged element 8 is an assembly including a sealing ring 16, a compressible oil or fluid impervious ring 20 and a mounting member 26, all as shown in Fig. 3.

The sealing ring 16 has on one side thereof a reduced portion, preferably tapered, to form a comparatively narrow flat metal surface 18, which is preferably ground, polished, or otherwise finished, and is adapted in use to circumferentially bear against the surface 14 of the flange 12 to provide a positive oil seal at all times. As shown, the sealing ring is of a substantial width axially to provide adequate wear allowance.

As shown in Fig. 1, the sealing ring 16 is, in this form of my invention, mounted for axial movement within a recess 30 of the member 26. This member 26 comprises an annular, cup-shaped member having a side wall 28, adapted to be driven with a press fit into counterbore 62 of outer raceway 56, so that, preferably, member 26 is flush with the outer end of the raceway, and a radial wall 32 and an inner axial wall 34, the three walls forming the recess 30 which faces the flange 12. The wall 32 is of such radial width that the axial wall 34 will in use have radial clearance with the collar 40 and wall 34 also has axial clearance with the flange 12. As shown in Fig. 1, the flange 12 has adequate clearance with the wall 28.

To continuously force the bearing surface 18 of the sealing ring 16 against the bearing surface 14 of the flange 12, I interpose between the surface 9 (Fig. 3) of sealing ring 16 and the radial wall 32 resilient means comprising, in my preferred form, an oil or fluid impervious compressible ring 20, constructed of cork, rubber, fabric, plastic, or any other suitable compressible, resilient composition, preferably one which is vulcanizable. Among others, there are such compositions as those marketed under the names of "Duprene," "Corprene," or "Thiocol."

When the seal is assembled with mounting member 26 flush with the raceway ends, the compressible resilient ring 20 is compressed between the radial bearing surface 14 and the radial wall 32 and held compressed by the axial thrust of the ball bearing so that it continuously urges the sealing ring 16 axially towards the bearing surface 14. As shown, the ring 20 is confined against radial expansion by the walls 34 and 28 respectively of the mounting member 26.

It will be understood that even after assembly of the oil seal in the counterbore 62 and reduced portion 64 of the raceways 56 and 58, the inherent tendency of the ring 20 to expand continues to urge one of the raceways 56 or 58 in an axial direction relative to the other against the axially confining action of the balls 60 in the raceways. The oil seal 10, therefore, as utilized in Fig. 1, tends to prevent axial sway of the ball bearing resulting from too large clearance between the channels 66 and balls 60 (either initially present or developed in use through wear of the surfaces of the channnels 66 or of the balls 60 themselves) by riding the balls 60 up on axially opposed surfaces of the respective raceways.

As will be readily understood, the oil seal of Fig. 2, when mounted between the raceways of the ball bearing as so far described presents a unitary, precompressed, self-contained combination ball bearing and oil seal unit, the compression of the resilient ring 20 in this instance being maintained by the bearing. This unit may be readily mounted between concentric radially-spaced surfaces of a housing 15 and shaft 11, as shown in Fig. 1. In such use, the housing 15 may be conveniently supplied with a counterbore on its inner surface 22, into which counterbore the outer raceway 56 may be driven with a press fit. Similarly, the inner raceway 58 may be driven with a press fit onto a shaft 11.

To insure that the sealing ring 16, compressed ring 20, and mounting member 26 shall rotate together to prevent frictional wear of ring 20, I preferably provide the sealing ring and mounting member 26 with interlocking means which may take the form shown in Figs. 2 and 3, comprising a projection 70 on the sealing ring 16, radially received in a slot 72 formed in the wall 34 of the mounting member 26. Also, as shown in Fig. 4, it is preferable and especially desirable in constructions designed for high speed work, to vulcanize or otherwise secure the compressible ring 20 in the mounting member 26, as indicated at 74. This insures against fluid leakage between member 26 and ring 20.

It will be obvious that my oil seal, comprising the parts shown in Figs. 2 and 3, may be assembled directly between concentric radially-spaced surfaces of a housing 15 and a shaft 11, in such case the collar 40 may be given a driven press fit on the shaft 11, and the mounting member 26 may be securely fit within the bore 13 of the housing 15. In such case, the ring 20 would be compressed during the assembling of the shaft and housing.

As shown in Fig. 6, the oil seal parts may be reversed, and the construction be such that the part 8 (collar 40, and flange 12), which is secured to rotate with the shaft in Fig. 1, may be suitably modified for attachment to the housing or outer raceway; and the assembly which is secured to rotate with the housing (sealing ring 16, compressible ring 20 and member 26) in Fig. 1, may be suitably modified for attachement to the shaft or inner raceway. It will be obvious that when the ball bearing is omitted, some means such as a thrust bearing must be provided to prevent relative axial movement, at least in one direction, between the shaft and housing, otherwise the compression of the ring 20 could not be maintained. The seal itself prevents relative axial movement of the shaft and housing in the other direction. In Fig. 6, I have also illustrated an ordinary friction bearing 52 for the shaft and housing and a shoulder on the shaft 11 against which collar 40 abuts for accurate assemblage.

In Fig. 5 I have shown a modification in which the collar portion 40 is mounted on the shaft 11, abutting against the inner raceway 58 of a ball bearing, the flange 12 having axial clearance with the outer raceway 56 and radial clearance with the housing 15. The mounting member 26 is constructed with a radial wall 32 which has a portion 42 extending radially beyond the bore of the housing 15, and, in assembling, the mounting member 26 may be attached to the housing as by means of bolts 46 passing through appropriate apertures formed in extension 42 and into appropriate threaded bores 48 formed in the housing 15. As thus fastened, the mounting member 26 holds the sealing ring 16 against the bearing surface 14 of the flange 12 through the interposition of the compressed ring 20, which is confined in this case against outward radial expansion by the bore surface 22 functioning as the equivalent of wall 28 in Fig. 1. In this form also, appropriate interlocking means between the sealing ring and the mounting member 26, and between the compressible ring 20 and mounting member 26, as previously described, may be provided, and when assembled the seal operates to eliminate axial sway in the ball bearing as with the device shown in Fig. 1.

In Fig. 7, my collar 40 is mounted on shaft 11, and the rest of the asembly is similar to that shown in Fig. 1, except that the ball bearing has been omitted and a friction bearing 52 is provided between the housing 15 and shaft 11, as in the form shown in Fig. 6. In addition, Fig. 7 illustrates an oil seal which may be partially or wholly precompressed prior to assembly with the shaft and housing, or, preferably, the four parts 8, 16, 20 and 26, may be merely held from separation. This may be readily accomplished by extending the wall 28 of member 26 to extend beyond the ends of flange 12, so that wall 28 may be spun over flange 12 or otherwise inturned as shown at 36. This operation can be performed either to place ring 20 under compression or preferably to merely hold the parts together until they are assembled with the shaft and housing, according to what extent flange 12 is inturned. In the preferred latter form, during assembly, when ring 20 is compressed by the interposition of a thrust bearing between the shaft and housing, as previously described in connection with Fig. 6, turned over end 36 will be moved away from flange 12, thus preventing any frictional contact, which might be undesirable in many cases.

For convenience of assembly, I have so far described the bearing surface 14 as being formed upon a separate part 8, adapted to rotate with the shaft 11. However, as a modification of my invention, the bearing surface 14 may be provided either on a radial surface of a ball bearing raceway, as on the inner raceway, as shown in Figs. 8 and 12, or may be provided on an integral shoulder of the shaft, as in Fig. 14. Obviously, such surface may be formed on the outer raceway or on the housing, if accompanied by proper modification of the other parts.

Fig. 8, therefore, illustrates a device similar to that shown in Fig. 1, eliminating the separate flanged member 8, but providing its functional equivalent in a radial shoulder 12, provided on the inner raceway 58, which shoulder may be properly finished to function as a bearing surface 14. The sealing ring 16 is provided with a comparatively narrow flat metal surface 18 to bear against the surface 14, and a radially extending portion 76 and an axially extending portion 78, having radial clearance with the inner raceway. In a similar manner to that shown in Fig. 1, the ring 20 is compressed between surface 9 of the radial wall 76 of the sealing ring 16, and the radial wall 32 of the mounting member 26. This ring is confined against outward radial expansion by the wall 28 and against inward radial expansion by the wall 78 of the ring 16, which functions as the equivalent of wall 34 in Figs. 1 and 5. As also shown in Figs. 8, 9 and 10, interlocking means to insure mutual rotation or fixation of sealing ring 16 and mounting member 26 may be provided and may take the form of a slot 72' in axial wall 78 of sealing ring 16, into which a projection 70' on mounting member 26 extends radially. Also, vulcanization or its equivalent, as already described, may be provided between the compressible ring 20 and the mounting member 26. It will be understood that in the modification of Fig. 8, the oil seal operates, as in the device of Fig. 1, to prevent axial sway developing in the ball bearing, and the device may be manufactured, sold and mounted as a unitary combination oil seal and bearing, just as the device shown in Fig. 1.

Fig. 11 illustrates a modification in which the bearing surface 14 of the inner raceway 58 is provided at the end of the raceway instead of on an inset shoulder thereof, as in the device of Fig. 8. With this change in position of the bearing surface 14, sealing ring 16 is suitably modified to provide a radially extending annular portion 94 at the outer end of axial wall 78, having on its inner radial surface a bearing surface 18 adapted to cooperate with the raceway bearing surface 14. In this modification, the axially expansible means is still compressed between the radial wall 76 of the sealing ring 16 and the radial wall 32, and the axially extending portion 78 is provided with radial clearance from the reduced portion 64 of the inner raceway 56.

The modification shown in Fig. 12 incorporates the modification of Fig. 8 into the arrangement shown in Fig. 5, so that the bearing surface 18 of sealing ring 16 operates against a finished end of the inner raceway 58. In this modification, I have also shown the mounting member 26 with an axial wall 28 adapted to be secured to bore 13 of housing 15, as in a counterbore 22, so that, just as in Figs. 1 and 8, the inner surface of this wall 28 acts to confine the ring 20 against outward radial expansion, instead of the inner surface 22 of the bore 13, as shown in Fig. 5, and previously described. In this modification of Fig. 12, the ring 20 is compressed during the assembling of the shaft and housing, but after assembly, operates as with the devices of Figs. 1, 5 and 8 to eliminate axial sway in the ball bearings.

Figure 13:
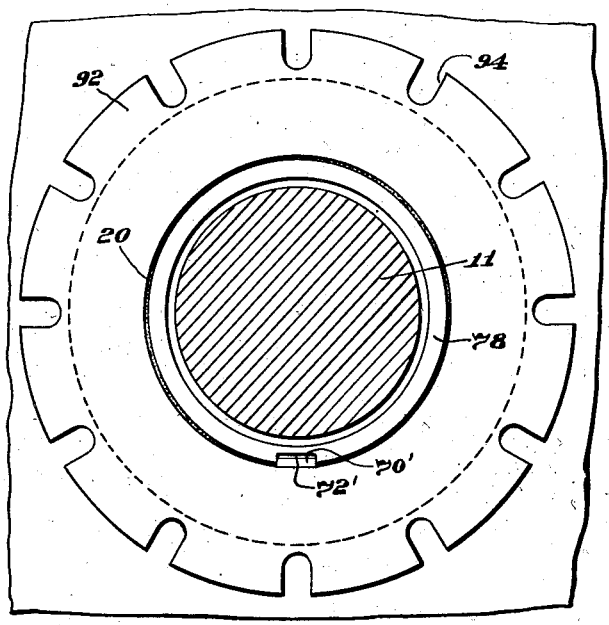
Fig. 13 is a side elevation of the device shown in Fig. 12.

As shown in Figs. 12 and 13, an extension 92, either integral with or welded to wall 32 of the mounting member 26, may be provided and may have suitable slots 94, so that a tool may be readily used for disassembling.

Figs. 14 and 15 illustrate another modification in which the surface 24 of shaft 11 is provided with a radial shoulder 12 having a bearing surface 14, properly finished and ground to form a seal with the sealing ring 16.

An added modification shown in Fig. 14 is the interposition of an interlocking split ring 80 between the axial wall 78 of the ring 16 and the shaft 11, as in grooves 82 and 84 thereof, respectively, to prevent separation of shaft 11 and ring 16 prior to assembly in the housing. In order, however, to allow axial movement of the sealing ring 16 relative to the shaft 11, the groove 84 in the shaft 11 is of a greater width than that of the split ring 80, as shown.

Fig. 16 illustrates another form of my seal which may be formed as a unit before assembly with the shaft and housing, thereby compressing ring 20 prior to such assembly. As shown, a split interlocking ring 86 is inserted in grooves 88 and 94 formed in wall 34 and collar 40 respectively, and acts as a thrust bearing to prevent separation of the unit. An anti-friction ball or other type of thrust bearing may be employed if desired.

In all forms of my invention, I prefer to construct the devices so that the bearing surfaces 14 and 18 are of different hardness for purposes well known in the art. Thus, in the constructions illustrated in Figs. 1, 5, 6, 7 and 16, the entire part 8, including the collar portion 40 and flange 12, may be constructed of a suitable soft metal such as bronze or brass, and the sealing ring may be made of steel.

However, in the constructions shown in Figs. 8, 11, 12 and 14, the sealing ring itself may be made of the softer metal, as the raceway or shaft must be of the harder metal. While I have thus described a construction wherein the cooperating bearing surfaces 14 and 18 are formed of metal, other compositions or substances having similar non-resilient properties and of comparable hardness may be used in forming either surface. Both in the specification and in the appended claims, therefore, the word "metal" is used with this broader connotation and is included merely to distinguish relatively soft compositions having wearing qualities inferior to metal, for example, leather, cork, and rubber.

Formation of the sealing ring 16 with the comparatively narrow flat surface 18 is desirable. There is a minimum of friction between the sealing surfaces and any differential of decrease in area between the bearing surface 18 and the opposite side 9 of the sealing ring will operate to provide a corresponding volumetric increase of pressure.

It is apparent that the bearing surfaces 14 and 18 may be respectively carried by the shaft 11 or by the housing 15; that the positions of the various parts of my improved oil seal assembly may be respectively reversed or inverted as in the various embodiments shown; that, as illustrated, various means may be employed to confine the ring 20 against radial expansion; and that, as illustrated, various means may be employed to retain the oil seal in operative compressed form or in precompressed, self-contained form, when that feature is desired, as the balls 66 themselves, the inturned flange 36, the split ring 86, other types of thrust bearing, or other suitable means. It is to be understood that these and further modifications may be made without departing from the spirit and scope of the invention as set forth in the appended claims.

My new oil seal is simple in construction, and functions to evenly, circumferentially force a sealing surface axially against a radially extending bearing surface to automatically provide a continuous and positive oil seal over a long period of time, and may, if desired, be used in combination with an anti-friction bearing, to continuously prevent any axial sway despite the development of excessive clearance in the bearing raceways.

This application is a continuation in part of my prior co-pending application Serial No. 77,695, filed May 4, 1936.

What I claim is:

1. An oil seal for shaft and housing members comprising a radially disposed annular metal bearing surface associated with one of said members, and an annular assembly mounted for rotation relative to said bearing surface, said assembly including a ring having a metal oil seal bearing surface abutting said radially disposed bearing surface, a mounting member rigidly secured to said other member for confining said ring and having a radial wall axially spaced from a portion of said oil seal ring, and an oil impervious vulcanizable resilient ring vulcanized to said mounting member and compressed between said radial wall and said oil seal ring to force said oil seal bearing surface axially against said radial bearing surface.

2. An oil seal unit comprising concentric radially-spaced relatively rotatable annular members adapted for attachment to a shaft and a housing for the shaft respectively, one of said members being provided with an annular radial metal bearing surface, and an annular assembly mounted intermediate said concentric members for rotation relative to said bearing surface, said assembly including a ring having a metal oil seal bearing surface abutting said radial bearing surface, a radial wall rigidly mounted on said other member and axially spaced from said oil seal ring, and solid, oil impervious, resilient means compressed between said radial wall and said oil seal ring to force said oil seal bearing surface axially against said radial bearing surface, and means for holding said concentric members against separation prior to attachment of said unit to said shaft and housing.

3. An oil seal unit for use between relatively rotatable shaft and housing members, comprising an element adapted to be rigidly attached to one of said members and having a radial bearing surface thereon, an axially movable sealing ring having a finished annular bearing surface, a solid, oil impervious, resilient, compressible ring adapted to be mounted on the other of said members with an axial surface radially confined thereby and with one end rigidly held relative thereto, and with an opposite end engaging said sealing ring to force said sealing ring bearing surface against said radial bearing surface, means adapted to confine the other axial surface of said compressible ring to retain it in radial compressed position by said other member, interlocking means to prevent relative rotation between said compressible ring and sealing ring, and means associated with said unit for maintaining said radial bearing surface, said sealing ring and said compressible ring against separation or in precompressed form prior to attachment of said unit to said shaft and housing members, whereby after attachment of said unit to said shaft and housing members said compressible ring may expansibly continuously force said sealing ring bearing surface axially against said radial bearing surface to function as an oil seal continuously as said bearing surfaces wear in use.

4. An oil seal for concentric radially-spaced surfaces on shaft and housing members comprising an annular finished bearing surface associated with one of said members and radially disposed intermediate said concentric surfaces, an annular assembly mounted for rotation relative to said bearing surface, said assembly including a ring having a metal oil seal bearing surface abutting said radially disposed bearing surface, a radial wall rigidly mounted on the other member and axially spaced from said oil seal ring, concentric radially spaced walls extending axially between said ring and said radial wall to form an annular recess defined by said radial wall, said concentric walls and said oil seal ring, and solid, oil impervious, resilient means filling said recess and under compression between said radial wall, said concentric walls and said oil seal ring, to force said oil seal bearing surface axially against said radial bearing surface.

5. An oil seal for concentric radially-spaced surfaces on shaft and housing members, comprising a collar affixed to one of said members having a flange projecting radially therefrom intermediate said concentric surfaces, said flange having an annular finished radially disposed bearing surface, an annular assembly affixed to said other member for rotation relative to said bearing surface, said assembly including a ring having a metal oil seal bearing surface abutting said radially disposed bearing surface, a radial wall rigidly affixed on said other member and axially spaced from said oil seal ring, concentric radially spaced walls extending axially between said ring and said radial wall to form an annular recess defined by said radial wall, said concentric walls and said oil seal ring, and solid oil, impervious, resilient means filling said recess and under compression within said recess between said radial wall, said concentric walls and said oil seal ring, the construction and arrangement being such that said resilient means is placed under compression against and confined between said concentric walls and said radial wall and said oil seal ring by the act of assembly of said collar and said oil seal assembly between said concentric radially spaced surfaces on said shaft and housing members, with said concentric walls confining said solid resilient means against radial expansion to prevent leakage around the walls of said recess whereby said compressed resilient means may only expand axially to force the oil seal bearing surface of said ring continuously axially against the radial bearing surface of said collar to continuously function as an oil seal as said bearing surfaces wear in use.

ROBERT STEVENSON.